(12) United States Patent
Klair et al.

(10) Patent No.: US 9,646,118 B1
(45) Date of Patent: May 9, 2017

(54) LINKING OF SIMULATORS INTO A CIRCUIT DESIGN TOOL

(71) Applicant: Xilinx, Inc., San Jose, CA (US)

(72) Inventors: Rajvinder S. Klair, San Jose, CA (US); David A. Knol, Morgan Hill, CA (US); Sudipto Chakraborty, Longmont, CO (US)

(73) Assignee: XILINX, INC., San Jose, CA (US)

( * ) Notice: Subject to any disclaimer, the term of this patent is extended or adjusted under 35 U.S.C. 154(b) by 87 days.

(21) Appl. No.: 14/493,154

(22) Filed: Sep. 22, 2014

(51) Int. Cl.
*G06F 17/50* (2006.01)

(52) U.S. Cl.
CPC ...... *G06F 17/5009* (2013.01); *G06F 2217/04* (2013.01)

(58) Field of Classification Search
CPC ............. G06F 17/5009; G06F 17/5022; G06F 17/5036; G06F 17/504; G06F 17/50; G06F 11/27; G06F 11/273; G06F 11/3457
USPC ................. 716/104–107, 110–111, 117, 136; 703/13–14
See application file for complete search history.

(56) References Cited

U.S. PATENT DOCUMENTS

| | | | | |
|---|---|---|---|---|
| 5,526,517 A * | 6/1996 | Jones | ...................... | G06F 17/50 707/999.008 |
| 8,862,770 B1 * | 10/2014 | Smith | ................. | G06F 17/5022 709/236 |
| 2006/0282248 A1 * | 12/2006 | Kageyama | .......... | G06F 17/5009 703/13 |
| 2010/0070255 A1 * | 3/2010 | Biltz | ..................... | G06F 11/261 703/13 |

* cited by examiner

*Primary Examiner* — Nghia Doan
(74) *Attorney, Agent, or Firm* — LeRoy D. Maunu

(57) ABSTRACT

Simulators are linked to a circuit design tool by establishing a plurality of simulator objects in response to a plurality of registration commands, respectively. Each registration command specifies a simulation interface application associated with one of the simulators, and the simulation interface application has procedures for initiating functions of the associated simulator. For each simulator, values of properties of the simulator are stored in the respective simulator object. The values of the properties include references to the procedures of the associated simulation interface application. An interface, which is responsive to input commands, accesses the values of the properties and executes the procedures referenced by the values of the properties to initiate the functions of the simulators.

18 Claims, 4 Drawing Sheets

LINKING OF SIMULATORS INTO A CIRCUIT DESIGN TOOL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The disclosure generally relates to linking multiple different simulators to a circuit design tool.

BACKGROUND

Some circuit design tools provide functions for entering and editing circuit designs, managing different projects, simulating the circuit design, and generating data leading to a realization of the circuit design. In order to provide circuit developers with a wide range of simulation options, some vendors of circuit design tools have integrated different simulators into their circuit design tools. Certain simulators may be better suited for certain circuit applications than other simulators. Also, different circuit developers may prefer different simulators.

Current approaches for integrating simulators into electronic circuit designs may be problematic in that maintenance costs may be increased and bug fixes may not be timely. A current approach for integrating a simulator into a circuit design tool, which provides functions beyond simulation to a designer, entails linking the functions of the simulator to the interface and functions of the design tool with program code that is compiled along with the program code that implements the design tool. In approaches in which linking simulators to a design tool requires compilation of the design tool, maintenance costs will be increased because the party responsible for the design tool will be forced to rebuild the design tool with each new release of an integrated simulator. Also, if a problem is discovered in a simulator, providing a new version of the simulator to an end-user may be delayed, because different parties may be responsible for the correct operation of the different simulators and circuit design tool, and the design tool would need to be rebuilt to integrate the new version of the simulator.

SUMMARY

A method of linking simulators to a circuit design tool includes establishing a plurality of simulator objects in response to a plurality of registration commands, respectively. Each registration command specifies a simulation interface application associated with one of the simulators, and the simulation interface application has procedures for initiating functions of the associated simulator. For each simulator, the method stores values of properties of the simulator in the respective simulator object. The values of the properties include references to the procedures of the associated simulation interface application. The method provides an interface that, responsive to input commands, accesses the values of the properties and executes the procedures referenced by the values of the properties to initiate the functions of the simulators.

A system includes one or more processors and a memory arrangement coupled to the one or more processors. The memory arrangement is configured with instructions that when executed by the one or more processors cause the one or more processors to link a plurality of simulators to a circuit design tool by performing operations including establishing a plurality of simulator objects in response to a plurality of registration commands, respectively. Each registration command specifies a simulation interface application associated with one of the simulators, and the simulation interface application has procedures for initiating functions of the associated simulator. For each simulator, the system stores values of properties of the simulator in the respective simulator object. The values of the properties include references to the procedures of the associated simulation interface application. The system provides an interface that, responsive to input commands, accesses the values of the properties and executes the procedures referenced by the values of the properties to initiate the functions of the simulators.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which.

DETAILED DESCRIPTION OF THE DRAWINGS

Figure 1:
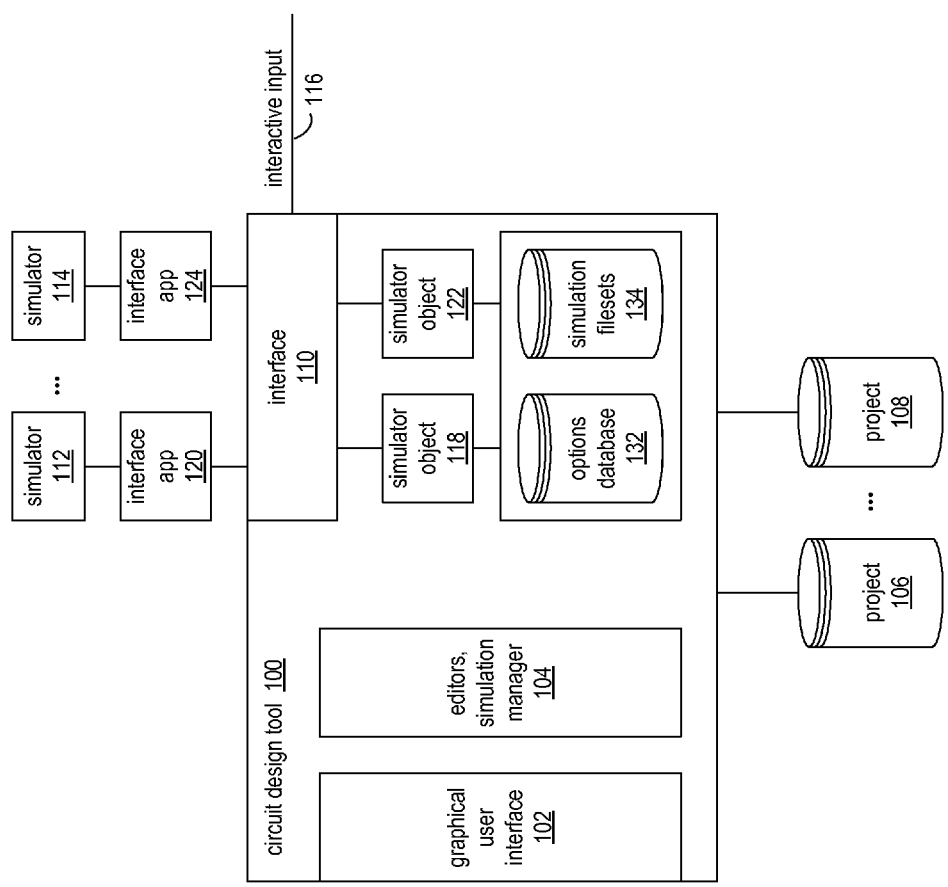
FIG. 1 shows a system for integrating different circuit design simulators into a circuit design tool.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed approaches for linking simulators to a circuit design tool include providing a programming interface in the circuit design tool. The interface provides a novel approach for linking simulators to a circuit design tool and allows the simulation flow to be customized for each simulator. In an example implementation, the interface interprets command language inputs for registering simulators with the circuit design tool, customizing the simulation flow for each simulator, and initiating functions of the simulators. No compilation of the circuit design tool is needed to integrate a simulator.

In one approach for linking simulators to a circuit design tool, a plurality of simulator objects are established in response to a plurality of registration commands, respectively. Each registration command specifies a simulation interface application associated with one of the simulators, and the simulation interface application has procedures for initiating functions of the associated simulator. For each simulator, values of properties of the simulator are stored in the respective simulator object. The values of the properties include references to the procedures of the associated simulation interface application. An interface is provided that, responsive to input commands, accesses the values of the properties and executes the procedures referenced by the values of the properties to initiate the functions of the simulators.

FIG. 1 shows a system for integrating different circuit design simulators into a circuit design tool 100. The circuit design tool includes a graphical user interface (GUI) 102 that provides access to design editors and simulation manager functions 104 of the tool. Functions are also provided for managing multiple different projects 106 through 108 created and managed under the design tool.

The interface 110 provides a mechanism for linking one or more simulators to the design tool and for customizing the simulation flows of the simulators. The system shows simulators 112 through 114 as examples of simulators linked to the tool. In an example implementation, the interface 110 is a command interface that supports interactive entry of user commands 116 as well as commands initiated via the GUI 102.

Each simulator is linked to the design tool 100 by two main components, a simulator object and an interface application. For example, simulator 112 is associated with simulator object 118 and interface application 120, and simulator 114 is associated with simulator object 122 and interface application 124. In an example implementation, the simulator objects are C++ objects and the interface applications are Tool Command Language (TCL) files having various procedures that are referenced by the simulator objects.

The simulator object defines data structures and methods for associating the procedures defined in an interface application with input commands. The procedures in an interface application are linked with properties in the associated simulator object. When a simulation is initiated in the circuit design tool 100, the procedures defined in the properties are executed. A command input to interface 110 references a property of a simulator object, and the value of the property in the object references a procedure in the associated interface application. The simulator object also stores and manages the simulator options that are specified in a simulation fileset of the simulation file sets 126.

Each interface application 120 through 124 is a collection of command language procedures that defines a simulation flow. The interface application provides methods for registering simulator options in a simulation fileset, executing a simulation step and provides a number of helper procedures for executing simulation sub-tasks. The interface application can be enhanced or fixed independently without compiling the circuit design tool 100, thereby providing a programmable solution in defining different simulation flows for different simulators.

Simulation flows may be further customized with data specified in the options database 132 and simulation filesets 134. The options database 132 contains a hash map table that includes simulation fileset objects, and each fileset object points to a list of options with name and value information. The lists of options referenced by the fileset objects in the options database 132 are stored as the simulation filesets 134. A simulation fileset controls functions of the simulator, and each simulator may have one or more associated filesets. When a simulation flow is executed in the circuit design tool, the property values of one of the filesets associated with the simulator are loaded in the simulator object of the simulator. For a simulator that has multiple filesets, the sets of values in the filesets may be different in order to provide different simulation flows when using the same simulator.

Each of projects 106 through 108 includes a project database (not shown) that references and/or stores data associated with the project. Such data includes, for example, simulator objects, fileset objects, circuit design files, and a list of simulators registered with the project. The circuit design tool enables users to create a project, save a project, and save a project as a different name, for example.

Figure 2:
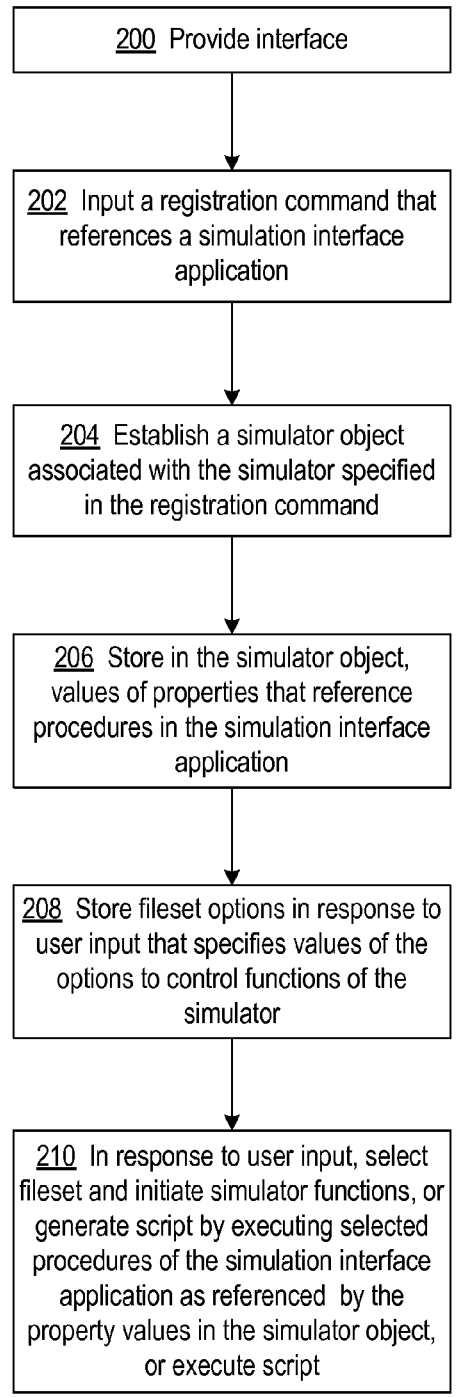
FIG. 2 shows a flowchart of a process for integrating different circuit design simulators into a circuit design tool.

FIG. 2 shows a flowchart of a process for integrating different circuit design simulators into a circuit design tool. The process generally entails establishing simulator objects in response to corresponding registration commands. Each of the registration commands specifies a simulation interface application associated with one of the simulators. Each simulation interface application has procedures for initiating functions of the associated simulator. Further in response to the registration commands, values of properties of the simulator are stored in the respective simulator object. The values of the properties include references to the procedures in the associated simulation interface application. A user interface is provided that is responsive to input commands. In response to user commands, the values of the properties in a simulator object are accessed, and the procedures referenced by the values of the properties are executed to initiate the functions of the simulator. Further details on the linking of simulators to a circuit design tool are described below in association with the process blocks of FIG. 2.

At block 200, an interface is provided for responding to input commands. In an example implementation, the interface is a command interface that supports interactive entry of user commands as well as commands initiated via a GUI. The interface may be provided by executing program code of the circuit design tool that is responsive to input commands as described herein.

At block 202, a registration command is input by the interface 110 (FIG. 1). The registration command may be entered by a user via interactive command line or by a GUI. The registration command specifies a simulator and a command to load the associated interface application. At block 204, in response to the registration command, a simulator object is established for the simulator. To establish the simulator object, memory or retentive storage may be allocated for the simulator object. The simulator object is an object on which users can execute commands to inspect the simulator object properties. The registration command generally allows a user to link a simulator to the circuit design tool and define the linkages to the interface application. The linkages are defined by assigning values to the properties of the simulator object.

In an example implementation, the command to register a simulator is implemented as follows:

```
Tcl Command:- register_simulator
Description   :- Register a simulator
Syntax        :- register_simulator -name <name> -description <desc> -bootstrap <TclCmd>
Parameters:-
    <name>   : Name of the simulator to register
    <desc>   : Short description of the simulator
    <TclCmd>: Command to load the associated Simulator Tcl interface application
Return Value:-
    Simulator : Simulator Tcl Object
```

At block 206, the values of the properties of the simulator object are stored in the simulator object. In the example implementation, the register_simulator command creates an entry in a C++ simulator map table data structure for the simulator object, initializes the default procedure names in the simulator object, initializes the default simulation step names, and initializes default log file names that will be generated after each step.

Table 1 describes the properties of the simulator object.

TABLE 1

| Property Name | Default/Modifiable Value | Purpose from API perspective |
|---|---|---|
| tclproc.bootstrap | tclapp::load_app xilinx::<simulator> | Execute the Tcl command specified in the value for loading the simulator Tcl interface application and the Tcl procedures defined in this application so that these procedures can be executed in tool Tcl Shell. |
| tclproc.register_options | ::tclapp::xilinx::<simulator>::register_options | Create the option specification for each option specified in the register_options Tcl procedure and initialize it with the default value specified. |
| tclproc.step_compile | ::tclapp::xilinx::<simulator>::compile | Execute the compile procedure defined in the Tcl interface application. Compile procedure contains the Tcl code for compiling the design using simulator compilation tools. |
| tclproc.step_elaborate | ::tclapp::xilinx::<simulator>::elaborate | Execute the elaborate procedure defined in the Tcl interface application. Elaborate procedure contains the Tcl code for elaborating the design using simulator elaboration tool. |
| tclproc.step_simulate | ::tclapp::xilinx::<simulator>::simulate | Execute the simulate procedure defined in the Tcl interface application. Simulate procedure contains the Tcl code for simulating the design using simulator tool. |

The following program code illustrates procedures in an interface application for the Vivado simulator. The procedures are "setup", "compile", "elaborate" and "simulate". Note that in the example code segments presented herein, "XSim" or "xsim" refers to Vivado circuit simulation software from XILINX, Inc.

```
# Copyright 2014 Xilinx, Inc.
namespace eval::tclapp::xilinx::xsim {
proc setup {args} {
    # Summary: initialize global vars and prepare for simulation
    # Argument Usage:
    # args: command line args passed from launch_simulation tcl task
    # Return Value:
    # true (0) if success, false (1) otherwise
    # initialize global variables
    ::tclapp::xilinx::xsim::usf_init_vars
    # initialize XSim simulator variables
    usf_xsim_init_simulation_vars
    # read simulation command line args and set global variables
    usf_xsim_setup_args $args
    # perform initial simulation tasks
    if {[usf_xsim_setup_simulation] } {
    return 1
    }
    return 0
}
proc compile {args} {
    # Summary: run the compile step for compiling the design files
    # Argument Usage:
    # args: command line args passed from launch_simulation tcl task
    # Return Value:
    # none
    usf_xsim_write_compile_script
    set proc_name [lindex [split [info level 0] " "] 0]
```

```
set step [lindex [split $proc_name {:}] end]
::tclapp::xilinx::xsim::usf_launch_script "xsim" $step
}
proc elaborate {args} {
    # Summary: run the elaborate step for elaborating the
compiled design
    # Argument Usage:
    # args: command line args passed from launch_simulation
tcl task
    # Return Value:
    # none
    send_msg_id Vivado-XSim-003 INFO "xsim::elaborate
design"
    usf_xsim_write_elaborate_script
    set proc_name [lindex [split [info level 0] " "] 0]
    set step [lindex [split $proc_name {:}] end]
    ::tclapp::xilinx::xsim::usf_launch_script "xsim" $step
}
proc simulate {args} {
    # Summary: run the simulate step for simulating the
elaborated design
    # Argument Usage:
    # args: command line args passed from launch_simulation
tcl task
    # Return Value:
    # none
    send_msg_id Vivado-XSim-004 INFO "xsim::simulate
design"
    usf_xsim_write_simulate_script
    set proc_name [lindex [split [info level 0] " "] 0]
    set step [lindex [split $proc_name {:}] end]
    ::tclapp::xilinx::xsim::usf_launch_script "xsim" $step
}
```

At block 208, fileset options are stored in response to a user command that specifies the values of the options. The options control the functions of the associated simulator. Any number of options may be created in a simulation fileset and can be directly used in the simulation flow. The options can be set to different values to achieve simulation run results for various settings, thereby providing programmability of the simulation flow. The options and assigned values are persisted as the simulation filesets 134 (FIG. 1) in retentive storage, such as disk storage.

In an example implementation, a "register_options" command provides the interface for creating options (properties) on a simulation fileset class and setting the default values. These similar options will be created for any new simulation fileset that is created by the user in the circuit design tool. The register_options will not re-register these options if the option is already created on the simulation fileset but the value of an option can be modified using the set_property command. Multiple simulation filesets with same options can have different values for those options.

The following program code illustrates an implementation of the register_options procedure in the interface application, for example, 120 or 124. Filesets are organized by project, and the register_options procedure calls the "::tclapp::xilinx::xsim::usf_create_options $simulator $options" procedure, which creates the options using "usf_create_fs_options_spec" and then finds all the filesets of type "simulation" and sets the default values for these options using the "set_property" command.

```
# Copyright 2014 Xilinx, Inc.
namespace eval ::tclapp::xilinx::xsim {
    proc register_options { simulator } {
        # Summary: define simulation fileset options
        # Argument Usage:
        # simulator: name of the simulator for which the options needs to be defined
        # Return Value:
        # true (0) if success, false (1) otherwise
        variable options
        if { { } == $simulator } {
            send_msg_id Vivado-XSim-001 ERROR "Simulator not specified.\n"
        }
        # is simulator registered?
        if {{ -1} == [lsearch [get_simulators] $simulator]} {
            send_msg_id Vivado-XSim-002 ERROR "Simulator '$simulator' is not registered\n"
            return 1
        }
        set options {
            {{compile.xvlog.nosort}          {bool} {0}       {Donot sort Verilog files}}
            {{compile.xvhdl.nosort}          {bool} {0}       {Donot sort VHDL files}}
            {{compile.xvlog.more_options}    {string}{}       {More XVLOG compilation options}}
            {{compile.xvhdl.more_options}    {string}{}       {More XVHDL compilation options}}
            {{elaborate.snapshot}            {string}{}       {Specify name of the simulation snapshot}}
            {{elaborate.debug_level} {enum} {{typical} {typical} {{all}{typical}{off}}}
                                                              {Specify simulation debug visibility level}}
            {{elaborate.relax}{bool}         {1}              {Relax}}
            {{elaborate.mt_level} {enum} {{auto}{auto}{{auto}{off}{2}{4}{8}{16}{32}}}
                                                              {Specify number of sub-compilation jobs to run in parallel}}
            {{elaborate.load_glbl}           {bool}  {1}{Load GLBL module}}
            {{elaborate.rangecheck}          {bool}     {0}{Enable runtime value range check for VHDL}}
            {{elaborate.sdf_delay}{enum} {{sdfmax} {sdfmax} {{sdfmin}{sdfmax}}}
                                                              {Specify SDF timing delay type to be read for use in timing simulation}}
            {{elaborate.unifast}             {bool}    {0}{Enable fast simulation models}}
            {{elaborate.xelab.more_options} {string}{} {More XELAB elaboration options}}
            {{simulate.runtime}              {string}{1000ns}  {Specify simulation run time}}
            {{simulate.uut}                  {string}  {}      {Specify instance name for design under test
                                                              (default:/uut)}}
            {{simulate.wdb}                  {string}  {}      {Specify waveform database file}}
            {{simulate.saif}                 {string}  {}      {SAIF filename}}
            {{simulate.xsim.more_options}    {string}  {}      {More XSIM simulation options}}
```

```
            }
        # create options
        ::tclapp::xilinx::xsim::usf_create_options $simulator $options
        return 0
    }
}
                    proc usf_create_options {simulator opts }{
                        # Summary: create options specification on simulation fileset class and set default values on all
                        # the simulation filesets found in the project.
                        # Argument Usage:
                        # simulator: name of the simulator for which the options needs to be defined
                        # opts: user specified options information
                        # Return Value:
                    # None
                        # create options
                        usf_create_fs_options_spec $simulator $opts
                        # simulation fileset objects
                        foreach fs_obj [get_filesets -filter {FILESET_TYPE == SimulationSrcs}] {
                            usf_set_fs_options $fs_obj $simulator $opts
                        }
                    }
                    proc usf_create_fs_options_spec {simulator opts }{
                        # Summary: Create options specification on simulation fileset class. Donot re-create options if it
                        # already exist on the simulation fileset class.
                        # Argument Usage:
                    # simulator: name of the simulator for which the options needs to be defined
                    # opts: user specified options information
                    # Return Value:
                        None
                        # create properties on the fileset object
                        foreach {row }$opts {
                            set name [lindex $row 0]
                            set type [lindex $row 1]
                            set value [lindex $row 2]
                            set desc [lindex $row 3]
                            # setup property name
                            set prop_name "${simulator}.${name}"
                            set prop_name [string tolower $prop_name]
                            # is registered already?
                            if { [usf_is_option_registered_on_simulator $prop_name $simulator] }{
                                continue;
                            }
                            # is enum type?
                            if {{enum} == $type }{
                                set e_value [lindex $value 0]
                                set e_default [lindex $value 1]
                                set e_values [lindex $value 2]
                                # create enum property
                                create_property -name "${prop_name}" -type $type -description $desc -enum_values $e_
                                    values -default_value $e_default -class fileset -no_register
                            } elseif {{file} == $type }{
                                set f_extns [lindex $row 4]
                                set f_desc [lindex $row 5]
                                # create file property
                                set v_default $value
                                create_property -name "${prop_name}" -type $type -description $desc -default_
                                    value $v_default -file_types $f_extns -display_text $f_desc -class fileset -no_register
                            } else {
                                set v_default $value
                                create_property -name "${prop_name}"-type $type -description $desc -default_
                                    value $v_default -class fileset -no_register
                            }
                        }
                    }
                    proc usf_set_fs_options {fs_obj simulator opts }{
                        # Summary: Set default value for each option on the simulation fileset object
                        # Argument Usage:
                    # fs_obj: Fileset object
                    # simulator: name of the simulator for which the options needs to be defined
                    # opts: user specified options information
                        # Return Value:
                    None
                        foreach {row }$opts {
                            set name [lindex $row 0]
                            set type [lindex $row 1]
                            set value [lindex $row 2]
                            set desc [lindex $row 3]
                            set prop_name "${simulator}.${name}"
                            # is registered already?
```

```
        if {[usf_is_option_registered_on_simulator $prop_name $simulator] }{
            continue;
        }
        # is enum type?
        if {{$enum} == $type }{
            set e_value [lindex $value 0]
            set e_default [lindex $value 1]
            set e_values [lindex $value 2]
            set_property -name "${prop_name}"-value $e_value -objects ${fs_obj}
        } else {
            set v_default $value
            set_property -name "${prop_name}" -value $value -objects ${fs_obj}
        }
    }
}
```

At block 210, simulator functions are initiated in response to user input commands. The commands specify a simulation fileset having the desired simulation options for performing the specified simulation functions. The simulation function is specified in the command, and the value of the corresponding property in the simulator object is used to reference the procedure in the interface application that initiates the desired functions of the simulator.

For each simulator that is registered, the circuit design tool creates a corresponding simulator object in the project object. To select a simulator, a user of the circuit design tool sets the "target simulator" property on the project object, which selects the corresponding simulator object. For example, the following command selects the simulator object for the Vivado simulator.

% set_property "TARGET_SIMULATOR" "XSim" [current_project]

If a user registers another simulator in the circuit design tool say XYZ, then its corresponding simulator object will be created and added to the current registered simulator list in the project object. The simulation object for this simulator will be selected once the set_property command is issued. For example, the following command will select the simulator object for the "XYZ" simulator.

% set_property "TARGET_SIMULATOR" "XYZ" [current_project]

In one implementation, a "launch_simulation" command and a "run_program" command are provided to initiate simulation functions. The interface 110 (FIG. 1) interprets the launch_simulation command and executes the procedures in the interface application as referenced by the simulator object properties. As set forth in Table 1 above, the procedures referenced by the simulator object initiate the setup, compile, elaborate and simulate functions.

In an example implementation, the launch_simulation command is implemented as follows:

```
Tcl Command    :- launch_simulation
Description    :- Launch simulation steps from the Tcl interface application
Syntax         :-launch_simulation [-step <name>] [-simset <fileset>] [-mode <mode_type>] [-type
<netlist_type>] [-scripts_only] [-of_objects <ip>] [-absolute_path] [-install_path <path>] [-noclean_dir]
[-batch]
Parameters:-
[-step <name>]           : Specify the name of the step
[-simset <fileset>]      : Specify the name of the fileset
[-mode <mode_type>]      : Specify mode type (behavioral or post-synth or post_impl)
[-type <netlist_type>]   : Specify netlist type (functional or timing)
[-scripts_only]          : Generate shell scripts only (do not execute the scripts)
[-of_objects <ip>]       : Specify the name of the IP
[-absolute_path]         : Set absolute file format for the design source files
[-install_path <path>]   : Specify the install path for the simulator tool executables
[-noclean_dir]           : Do not remove previous simulation results
[-batch]                 : Run simulation in batch mode (do not invoke simulator GUI)
Return Value:-
Tcl result: TCL_OK
```

The run_program command initiates execution of a shell script file generated by the "compile," "elaborate" and "simulate" procedures from the interface application. The shell script is a collection of simulator tool commands for compiling, elaborating and simulating a design. The shell script is generated in response to the "-scripts_only" parameter to the launch_simulation command as described above. In response to the "-scripts_only" parameter, the interface 110 initiates execution of the "usf_xsim_write_compile_script" procedure in the interface application.

The following program code illustrates an implementation of the "usf_xsim_write_compile_script" procedure in the interface application.

```
# Copyright 2014 Xilinx, Inc.
proc usf_xsim_write_compile_script {scr_filename_arg} {
    # Summary: Write the compile shell script for the compile step
    # Argument Usage:
    # scr_filename_arg: Output script filename
    # Return Value:
    # true (0) if success, false (1) otherwise
    upvar $scr_filename_arg scr_filename
    variable a_xsim_vars
    set top $::tclapp::xilinx::xsim::a_sim_vars(s_sim_top)
    set dir $::tclapp::xilinx::xsim::a_sim_vars(s_launch_dir)
    set fs_obj [get_filesets $::tclapp::xilinx::xsim::a_sim__vars(s_simset)]
```

```
    set src_mgmt_mode [get_property "SOURCE_MGMT_
MODE" [current_project]]
    set vlog_filename ${top};append vlog_filename "_vlog.
prj"
    set vlog_file [file normalize [file join $dir $vlog_file-
name]]
    set fh_vlog 0
    if {[catch {open $vlog_file w} fh_vlog]} {
    send_msg_id Vivado-XSim-012 ERROR "Failed to open
        file to write ($vlog_file)\n"
    return 1
    }
    set vhdl_filename ${top};append vhdl_filename "_vhdl-
.prj"
    set vhdl_file [file normalize [file join $dir $vhdl_file-
name]]
    set fh_vhdl 0
    if {[catch {open $vhdl_file w} fh_vhdl]} {
    send_msg_id Vivado-XSim-013 ERROR "Failed to open
        file to write ($vhdl_file)\n"
    return 1
    }
    set global_files_str { }
    set   design_files   [::tclapp::xilin::xsim::usf_uniquify_
cmd_str
[::tclapp::xilinx::xsim::usf_get_files_for_compilation
global_files_str]]
    puts $fh_vlog "# compile verilog/system verilog design
source files"
    puts $fh_vhdl "# compile vhdl design source files"
    foreach file $design_files {
    set type [lindex [split $file {#}] 0]
    set lib [lindex [split $file {#}] 1]
    set cmd_str [lindex [split $file {#}] 2]
    switch $type {
        {VERILOG} {puts $fh_vlog $cmd_str}
        {VHDL} {puts $fh_vhdl $cmd_str}
        default {
            send_msg_id Vivado-XSim-014 ERROR "Unknown
                filetype '$type':$file\n"
        }
    }
    }
    # compile glbl file
    set b_load_glbl [get_property "XSIM.ELABORATE-
.LOAD_GLBL" [get_filesets
$::tclapp::xilinx::xsim::a_sim_vars(s_simset)]]
    if {[::tclapp::xilinx::xsim::usf_compile_glbl_file "xsim"
$b_load_glbl $design_files] } {
    set top_lib [::tclapp::xilinx::xsim::usf_get_top_library]
    ::tclapp::xilinx::xsim::usf_copy_glbl_file
    set file_str"$top_lib\"glbl.v\""
    puts $fh_vlog "\n# compile glbl module\nverilog
        $file_str"
    }
    # nosort? (verilog)
    set b_no_sort [get_property "XSIM.COMPILE.XVLOG-
.NOSORT" [get_filesets
$::tclapp::xilinx::xsim::a_sim_vars(s_simset)]]
    if {$b_no_sort II ({DisplayOnly}==$src_mgmt_mode)||
({None}==$src_mgmt_mode)} {
    puts $fh_vlog "\n# Do not sort compile order\nnosort"
    }
    # nosort? (vhdl)
    set b_no_sort [get_property "XSIM.COMPILE.XVHDL-
.NOSORT" [get_filesets
$::tclapp::xilinx::xsim::a_sim_vars(s_simset)]]
    if {$b_no_sort II ({DisplayOnly}==$src_mgmt_mode)||
({None}==$src_mgmt_mode)} {
    puts $fh_vhdl "\n# Do not sort compile order\nnosort"
    }
    close $fh_vlog
    close $fh_vhdl
    # write compile.sh/.bat
    set scr_filename "compile";append scr_filename [::tclap-
p::xilinx::xsim::usf_get_script_extn]
    set scr_file [file normalize [file join $dir $scr_filename]]
    set fh_scr 0
    if {[catch {open $scr_file w} fh_scr]} {
    send_msg_id Vivado-XSim-015 ERROR "Failed to open
        file to write ($scr_file)\n"
    return 1
    }
    set s_plat_sw "-m64"
    if   {{32}==$::tclapp::xilinx::xsim::a_sim_vars(s_int_o-
s_type)} {
    set s_plat_sw "-m32"
    }
    set s_dbg_sw { }
    set    dbg    $::tclapp::xilinx::xsim::a_sim_vars(s_int_
debug_mode)
    if {$dbg} {
    set s_dbg_sw {-dbg}
    }
    set xvlog_arg_list [list "$s_plat_sw" "-prj" "$vlog_file-
name"]
    set   more_xvlog_options   [string   trim   [get_property
"XSIM.COMPILE.XVLOG.MORE_OPTIONS" $fs_obj]]
    if {{ } !=$more_xvlog_options} {
    set   xvlog_arg_list   [linsert   $xvlog_arg_list   end
        "$more_xvlog_options"]
    }
    set xvlog_cmd_str [join $xvlog_arg_list " "]
    set xvhdl_arg_list [list "$s_plat_sw" "-prj" "$vhdl_file-
name"]
    set   more_xvhdl_options   [string   trim   [get_property
"XSIM.COMPILE.XVHDL.MORE_OPTIONS" $fs_obj]]
    if {{ } !=$more_xvhdl_options} {
    set   xvhdl_arg_list   [linsert   $xvhdl_arg_list   end
        "$more_xvhdl_options"]
    }
    set xvhdl_cmd_str [join $xvhdl_arg_list " "]
    if {$::tcl_platform(platform)=="unix"} {
    set redirect_cmd_str "2>&1|tee-a compile.log"
    puts $fh_scr "#!/bin/sh-r
    puts $fh_scr "xv_path=1"$::env(XILINX_VIVADO)\" "
    ::clapp::xilinx::xsim::usf_write_shell_step_fn $fh_scr
    puts   $fh_scr   "ExecStep\$xv_path/bin/xvlog $xvlog_
        cmd_str $redirect_cmd_str"
    puts $fh_scr "ExecStep \$xv_path/bin/xvhdl $xvhdl_c-
        md_str $redirect_cmd_str"
    } else {
    puts $fh_scr "@echo off"
    puts   $fh_scr   "set   xv_path=[::tclapp::xilinx::xsim::
        usf_get_rdi_bin_path]"
    puts $fh_scr "call % xv_path %/xvlog $s_dbg_sw
        $xvlog_cmd_str-log compile.log"
    puts $fh_scr "if \"%errorlevel %\"==\"1\" goto END"
    puts $fh_scr "call % xv_path %/xvhdl $s_dbg_sw $xvh-
        dl_cmd_str"
    puts $fh_scr "if \"%errorlevel %\"==\"1\" goto END"
    puts $fh_scr "if \"%errorlevel%\"==\"0\" goto SUC-
        CESS"
    puts $fh_scr ":END"
```

```
puts $fh_scr "exit 1"
puts $fh_scr ":SUCCESS"
puts $fh_scr "exit 0"
 }
 close $fh_scr
}
```

In an example implementation, the run_program command is implemented as follows:

```
Tcl Command      :- run_program
Description      :- Execute the step shell scripts containing simulator tool commands
Syntax           :- run_program [-nowait] <script_file>
Parameters:-
   [-nowait]       : Do not wait for child process to finish.
   <script_file>   : Specify the name of the script file to execute
Return Value:-
   Tcl result: TCL_OK or TCL_ERROR
```

Figure 3:
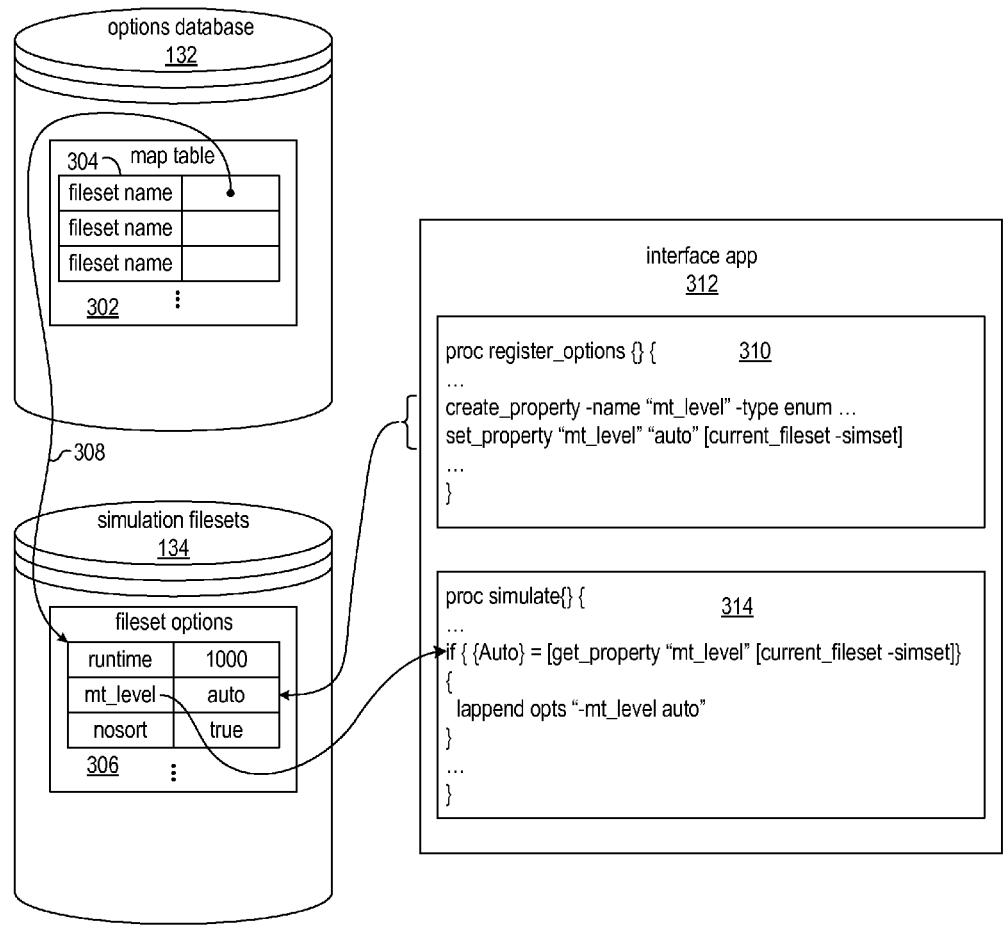
FIG. 3 shows the relationship between procedures in an interface application and the options in a simulation file set.

FIG. 3 shows the relationship between procedures in an interface application and the options in a simulation file set. The options database 132 includes a map table 302, and the map table maps names of filesets to a set of fileset options. For example, fileset name 304 is mapped to the set 306 of fileset options as shown by line 308. The simulation filesets 134 may include multiple sets of fileset options. Each set of fileset options may alternatively be referred to as a fileset.

Fileset options can be created within the register_options procedure and subsequently used in the procedures that initiate the simulation functions. For example, the register_options procedure 310 in the interface application 312 invokes the create_property procedure to create the "mt_level" option and invokes the set_property procedure to set the value of mt_level to "Auto."

The fileset options can be used by the procedures in the interface application that invoke the functions of the simulator. In the example of FIG. 3, the simulator procedure 314 uses the get_property procedure to obtain the value of the mt_level option, and the value mt_level option is used to determine the condition of the "if" statement.

In an example implementation, the create_property and set_property commands are implemented as follows:

including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Processor computing arrangement 400 includes one or more processors 402, a clock signal generator 404, a memory arrangement 406, a storage arrangement 408, and an input/output control unit 410, all coupled to a host bus 412. The arrangement 400 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 402 may be one or more general purpose processors, or a combination of one or more general purpose processors and suitable co-processors, or one or more specialized processors (e.g., RISC, CISC, pipelined, etc.).

The memory arrangement 406 typically includes multiple levels of cache memory, and a main memory. The storage arrangement 408 may include local and/or remote persistent storage, such as provided by magnetic disks (not shown),

```
Tcl Command:- create_property
Description   :- Create property specification for simulation fileset class
Syntax        :- create_property -name <name> -type <type> -description <text> -default_value <value>
                 [-enum_values <values>] -class <fileset>
Parameters:-
-name <name>              : Name of the property
-type <type>              : Type of the property (string, bool, enum, file)
-description <text>       : Property description (help text)
-default_value <value>    : Default value set by user
-class <fileset>          : Class type (simulation fileset)
Return Value:-
Tcl result: TCL_OK
Tcl Command:- create_property
Description   :- Create property specification for simulation fileset class
Syntax        :- create_property -name <name>-type <type> -description <text> -default_value <value>
                 [-enum_values <values>] -class <fileset>
Parameters:-
-name <name>              : Name of the property
-type <type>              : Type of the property (string, bool, enum, file)
-description <text>       : Property description (help text)
-default_value <value>    : Default value set by user
-class <fileset>          : Class type (simulation fileset)
```

Figure 4:
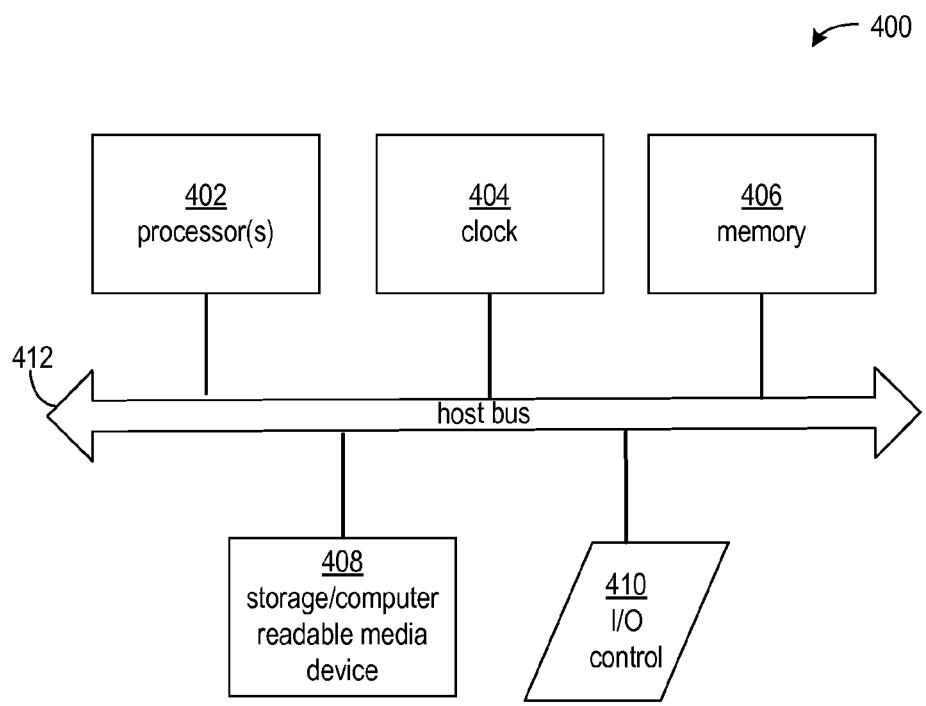
FIG. 4 shows a block diagram of an example computing arrangement that may be configured to implement the data structures and processes described herein.

FIG. 4 shows a block diagram of an example computing arrangement that may be configured to implement the data structures and processes described herein. It will be appreciated that various alternative computing arrangements, flash, EPROM, or other non-volatile data storage. The storage unit may be read or read/write capable. Further, the memory arrangement 406 and storage arrangement 408 may be combined in a single arrangement.

The processor(s) 402 executes the software in storage arrangement 408 and/or memory arrangement 406, reads data from and stores data to the storage arrangement 408 and/or memory arrangement 406, and communicates with external devices through the input/output control arrangement 410. These functions are synchronized by the clock signal generator 404. The resource of the computing arrangement may be managed by either an operating system (not shown), or a hardware control unit (not shown).

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for integrating simulators with circuit design tools. Other aspects and features will be apparent to those skilled in the art from consideration of the specification. It is intended that the specification and drawings be considered as examples only, with a true scope of the invention being indicated by the following claims.

What is claimed is:

1. A method of linking simulators to a circuit design tool, comprising:
   on a processor, performing operations including:
      establishing a plurality of simulator objects in memory accessible to the circuit design tool in response to a plurality of registration commands input to the circuit design tool, respectively, each registration command specifying a respective simulation interface application associated with one of the simulators, and the respective simulation interface application having procedures for initiating functions of the associated simulator;
      for each simulator, storing values of properties of the simulator in the respective simulator object, the values of the properties including references to the procedures of the associated simulation interface application;
      wherein each simulator object and associated simulation interface application links the circuit design tool to one of the simulators without compilation of the circuit design tool;
      accessing, responsive to input commands to an interface, the values of the properties and executing the procedures referenced by the values of the properties to initiate the functions of the simulators; and
      initiating by the interface, a compilation procedure of the simulation interface application in response to user input that specifies a compilation property of the simulator object, and executing by the compilation procedure a compilation function of the simulator that compiles a circuit design.

2. The method of claim 1, wherein the simulation interface application is specified in a command language.

3. The method of claim 1, wherein the interface is a command language interface.

4. The method of claim 1, further comprising for at least one of the simulators, storing a plurality of sets of values of simulation options in response to user commands that specify the sets of values, wherein the simulation options control functions of the at least one of the simulators, and the values of the simulation options in the plurality of sets are different.

5. The method of claim 4, wherein the user commands that specify the sets of values initiate execution of a register-options procedure in the simulation interface application associated with the at least one of the simulators.

6. The method of claim 5, further comprising for the at least one of the simulators, creating at least one of the simulation options in response to a command in the register-options procedure that specifies the option.

7. The method of claim 1, wherein the interface initiates an elaboration procedure of the simulation interface application in response to user input that specifies an elaboration property of the simulator object, and the elaboration procedure executes an elaboration function of the simulator.

8. The method of claim 1, wherein the interface initiates a simulation procedure of the simulation interface application in response to user input that specifies a simulation property of the simulator object, and the simulation procedure executes a simulation function of the simulator.

9. The method of claim 1, wherein the interface generates a script that specifies execution of a compilation function of the simulator in response to user input that specifies a compilation property of the simulator object and generation of a script.

10. The method of claim 1, wherein the interface generates a script that specifies execution of an elaboration function of the simulator in response to user input that specifies an elaboration property of the simulator object and generation of a script.

11. The method of claim 1, wherein the interface generates a script that specifies execution of a simulation function of the simulator in response to user input that specifies a simulation property of the simulator object and generation of a script.

12. The method of claim 1, wherein the interface:
   generates a script that specifies execution of a compilation, elaboration and simulation function of the simulator in response to user input that specifies a compilation, elaboration and simulation property of the simulator object and generation of a script; and
   executes the script in response to user input that specifies the script.

13. A system comprising:
   one or more processors;
   a memory arrangement coupled to the one or more processors and configured with instructions that when executed by the one or more processors cause the one or more processors to link a plurality of simulators to a circuit design tool by performing operations including:
      establishing a plurality of simulator objects in the memory arrangement and accessible to the circuit design tool in response to a plurality of registration commands input to the circuit design tool, respectively, each registration command specifying a respective simulation interface application associated with one of the simulators, and the respective simulation interface application having procedures for initiating functions of the associated simulator;
      for each simulator, storing values of properties of the simulator in the respective simulator object, the values of the properties including references to the procedures of the associated simulation interface application;
      wherein each simulator object and associated simulation interface application links the circuit design tool to one of the simulators without compilation of the circuit design tool;
      accessing, responsive to input commands to an interface, the values of the properties and executing the procedures referenced by the values of the properties to initiate the functions of the simulators; and initiating by the interface, a compilation procedure of the simulation interface application in response to user input that specifies a compilation property of the simulator object, and executing by the compilation procedure a compilation function of the simulator that compiles a circuit design.

14. The system of claim 13, wherein the simulation interface application is specified in a command language.

15. The system of claim 13, wherein the interface is a command language interface.

16. The system of claim 13, wherein the operations further include for at least one of the simulators, storing a plurality of sets of values of simulation options in response to user commands that specify the sets of values, wherein the simulation options control functions of the at least one of the simulators, and the values of the simulation options in the plurality of sets are different.

17. The system of claim 16, wherein the user commands that specify the sets of values initiate execution of a register-options procedure in the simulation interface application associated with the at least one of the simulators.

18. The system of claim 17, wherein the operations further include for the at least one of the simulators, creating at least one of the simulation options in response to a command in the register-options procedure that specifies the option.

\* \* \* \* \*